(12) United States Patent
Raju

(10) Patent No.: US 12,224,656 B2
(45) Date of Patent: Feb. 11, 2025

(54) MODULAR POWER CONVERTER WITH BYPASSABLE ISOLATED MODULES

(71) Applicant: Ravisekhar Nadimpalli Raju, Clifton Park, NY (US)

(72) Inventor: Ravisekhar Nadimpalli Raju, Clifton Park, NY (US)

( * ) Notice: Subject to any disclaimer, the term of this patent is extended or adjusted under 35 U.S.C. 154(b) by 152 days.

(21) Appl. No.: 18/107,007

(22) Filed: Feb. 8, 2023

(65) Prior Publication Data

US 2024/0266939 A1 Aug. 8, 2024

(51) Int. Cl.
*H02M 3/155* (2006.01)
*H02M 1/00* (2007.01)
*H02M 7/217* (2006.01)

(52) U.S. Cl.
CPC ......... *H02M 1/0045* (2021.05); *H02M 3/155* (2013.01); *H02M 7/217* (2013.01)

(58) Field of Classification Search
CPC ............................ H02M 1/0045; H02M 3/155
See application file for complete search history.

(56) References Cited

U.S. PATENT DOCUMENTS

2015/0008874 A1* 1/2015 Sidorenko ............. H02J 7/0014
320/107
2024/0356427 A1* 10/2024 Liu ........................ H02J 3/46

FOREIGN PATENT DOCUMENTS

CN 113015663 A * 6/2021
CN 115313824 A * 11/2022

OTHER PUBLICATIONS

Yeh Ting "A Modular DC-DC Converter with Bypass Switch", Published 2013 (Year: 2013).*

* cited by examiner

*Primary Examiner* — Sisay G Tiku

(57) ABSTRACT

A modular power conversion system is provided which includes a plurality of modules (building blocks) comprised of transformers and power conversion bridges. The modules are connected in series on either the input or output side and in parallel on the other side. A substantial number of the modules are operated in a fixed input-to-output voltage ratio, with the remaining module(s) operated in a variable input-to-output ratio. The fixed ratio modules are either placed in an active mode or in a bypassed mode. A controller sets the proportion of active and bypassed modules and controls the variable ratio modules, thus allowing an adjustable input-to-output ratio for the overall converter system. Prior to the bypassing of a module, the energy stored in its internal bus or link is dissipated or stored in an auxiliary circuit or moved to a neighboring module.

3 Claims, 7 Drawing Sheets

MODULAR POWER CONVERTER WITH BYPASSABLE ISOLATED MODULES

STATEMENT OF GOVERNMENT INTEREST

Portions of this invention were made with government support under N6833521C0784 awarded by the U.S. Department of Navy. The government has certain rights in the invention.

CROSS-REFERENCE TO RELATED APPLICATION

This application claims the benefit of U.S. Provisional Patent Application No. 63/307,596, filed 7 Feb. 2022, which is incorporated by reference herein in its entirety.

BACKGROUND

Power converters with isolation are widely used in many applications to convert an AC or DC input to an AC or DC output. For example, AC-DC converters are used for converting household 120 VAC power to a lower voltage DC such as 5 VDC to charge or operate consumer electronics devices such as phones. Newer applications are in areas such as electric vehicle charging from low voltage 120 VAC or 240 VAC household outlets or at higher power levels from a 480 VAC feed or medium voltage grid such as 13.8 kVAC. DC-DC converters are used in applications such as computers, servers and telecommunication equipment to step down from a higher voltage DC bus such as 24 VDC or 48 VDC to a lower voltage such as 1.3 VDC or 3.3 VDC. In many of these applications, the input can vary widely while the output needs to be regulated. A single switching power converter stage that performs the regulation through control action such as pulse-width or frequency change while also providing isolation and step-down through a transformer can be used for these applications but often results in a degraded efficiency. As an alternative, two stage converters are often used. These have, for example, a boost stage to convert the varying input voltage to a fixed intermediate voltage followed by a high frequency transformer-isolated stage to provide step-up/down and isolation. The two stage conversion can result in improved efficiency due to the two stages operating in their optimized range. However, the use of two active switching stages has the disadvantage of added cost.

Therefore, what is needed are techniques that overcome the above mentioned disadvantages. The present invention uses a modular structure comprising isolated power converter modules connected in series or parallel, and wherein a majority of the modules use a single active switching stage within the module. Regulation of the input and output variables/waveforms such as voltages and currents is performed in part by inserting or bypassing a variable number of modules depending on the operating point. Prior to bypassing a module, the energy stored in its power switching bridge links, for example dc bus capacitors, is depleted or extracted to allow the link or bus to be shorted for bypassing the module.

BRIEF SUMMARY OF THE INVENTION

Embodiments of the invention provide a power conversion system with converter modules (building blocks) connected in series or parallel, wherein one or more of the modules are bypassed or inserted depending on the operating point of the conversion system, and wherein bypassing of a module is performed by depleting or extracting the energy stored in an internal link or bus of the module and then shorting the internal link or bus of the module.

In accordance with one aspect of the invention, a DC-DC converter comprises a plurality of modules (building blocks) that are connected in series on the input side and in parallel on the output side. A first set of the modules consists of a substantial portion of the overall number of modules. A portion of the modules in this first set are placed in a fixed-ratio active mode and the remaining portion are placed in a bypass mode. During the active mode, these modules are operated in a substantially fixed input-to-output conversion ratio by operating their switches in a substantially fixed duty ratio, while in the bypass mode their local input bus or link is shorted and they do not contribute to the overall converter system input-output ratio. A second set of module(s) are controlled to provide a variable input-output ratio. The variable ratio can be achieved through pulse-width modulation (PWM), frequency control, or other means known in the art. Varying the number of modules that are active or bypassed in the first set of modules and varying the input/output ratio of the second set of modules provides control of the overall input/output ration of the system. For example in a system with five modules where four modules have a 1:1 input-to-output ratio and one module has a variable ratio, a 3.2:1 overall input-to-output ratio can be achieved by activating three of the 1:1 modules, bypassing one of the 1:1 modules and operating the variable ratio converter at a 0.2:1 ratio through PWM. With a varying DC input, the effective ratio of the system can be adjusted, for example, to maintain a fixed DC output voltage.

In accordance with another aspect of the invention, the modules in the power converter system include a rectifier at the input side to convert an AC input to a DC or pulsating DC at an intermediate link or bus of the modules.

According to yet another aspect of the invention, the DC bus or link capacitor energy in a module is extracted and stored temporarily in an auxiliary circuit such that the DC bus or link voltage is brought down to substantially zero voltage followed by keeping the switches across the DC bus or link ON simultaneously to provide a short/conduction path that places the module in a bypassed mode. In the bypassed mode, the module does not contribute to power flow to the output side.

According to yet another aspect of the invention, the DC bus or link capacitor energy in a module is extracted and moved to a neighboring module, such that the DC bus or link voltage in the first module is brought down to substantially zero voltage to allow the first module to be placed in a bypass mode by turning on the switches across the DC bus or link.

According to yet another aspect of the invention, the DC bus or link capacitor energy in a module is dissipated in an element such as a resistor prior to placing the module in a bypassed state.

According to yet another aspect of the invention, a portion of the modules in the modular converter system comprise a resonant circuit with inductors and capacitors wherein the resonance naturally results in instances of substantially zero voltage across the resonant capacitor at which point the complimentary switches are turned on and kept on simultaneously to place the module in a bypassed state.

According to yet another aspect of the invention, a control system regulates the bypass, activation, or input-output ratio of individual modules to realize a desired overall input-output ratio of the converter system.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
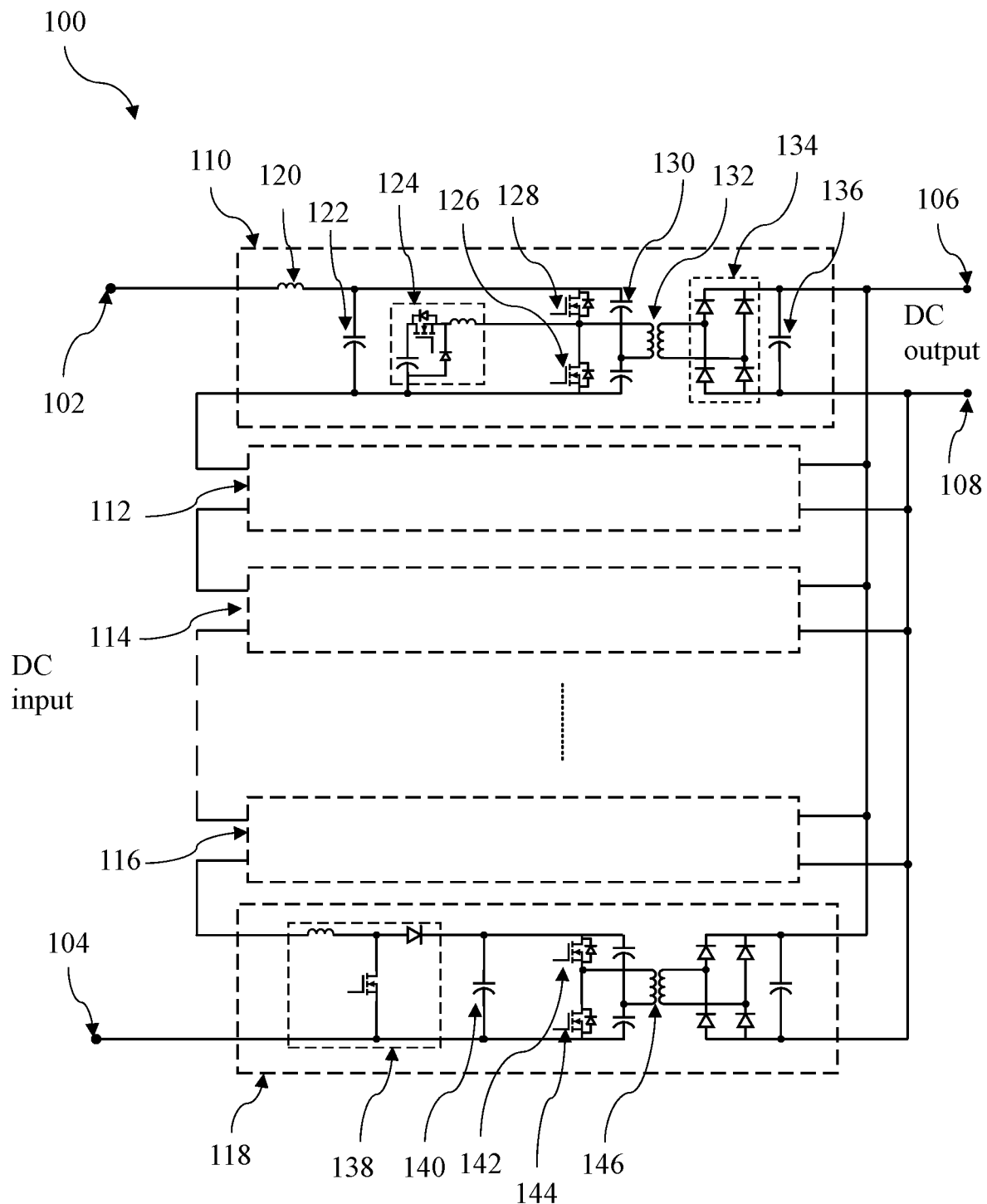
FIG. 1 illustrates a modular DC-DC power conversion system with transformer isolated modules connected in series on the input side and parallel on the output side, with bypass of one or more of the individual modules achieved by retrieving the input-side dc link capacitor energy in the module through an auxiliary circuit followed by shorting the dc link, according to one embodiment of the present invention.

FIG. 1 illustrates a power conversion system, 100, according to an embodiment of the present invention. The power conversion system has a DC input port with terminals, 102 and 104, and a DC output port with terminals, 106 and 108. The power conversion system has multiple power converter modules or building blocks, 110, 112, 114, 116 and 118. The modules are connected in series on the DC input side and parallel on the DC output side. The modules 112, 114 and 116 have substantially identical operating mode and structure as module 110. Module 110 consists of a DC link or bus capacitor 122 on the input side which feeds a half-bridge consisting of power semiconductor switches 126 and 128. Switches 126 and 128 are operated in a substantially complementary mode to place a high frequency substantially square wave voltage across the transformer 132. Split capacitors, 130, can optionally be selected to resonate with the leakage inductance of transformer, 132, such that switches 126 and 128 are switched in a soft-switching mode near zero voltage or current instances. The high frequency voltage is stepped up or down by the transformer 132 and the transformer output passes through a rectifier, 134, to feed the capacitor, 136, and DC output, 106. Switches 126 and 128 are operated at a substantially fixed frequency and duty cycle when module 110 is active, and hence the input-to-output voltage ratio of the module 110 is substantially fixed and determined by the turns ratio of transformer 132. When module 110 is required to be bypassed, auxiliary circuit 124 retrieves the energy stored in DC capacitor 122 such that the voltage across the input side internal DC bus of module 110 becomes substantially zero. Switches 126 and 128 are then turned on and kept on simultaneously to establish a conduction path through them that substantially shorts the input side of the module 110, thus placing it in a bypassed mode. In this bypassed mode, module 110 does not transfer power to the output through its transformer and does not contribute to the overall converter system input-to-output ratio. Modules 112, 114, and 116 are operated in a mode similar to module 110, i.e., with a varying number of them placed either in a fixed-ratio active mode or in a bypassed mode. Module 118 comprises an input stage, 138, that converts the input voltage across module 118 to a regulated voltage across capacitor 140 which then feeds a half-bridge consisting of switches 142 and 144. Switches 142 and 144 are operated in a complementary fashion to feed transformer 146, the output of which is rectified and connected to DC output 106. The input stage 138 of module 118 provides a variable voltage gain through PWM while the downstream transformer-isolated stage consisting of switches 142 and 144 operates in a fixed-ratio gain, with the combination of the two stages providing a variable ratio determined by the product of the two gains. The overall input-to-output ratio of the power converter system, 100, is adjusted by changing the proportion of modules among 110, 112, 114, and 116 that are bypassed or active and by adjusting the gain of stage 138 in module 118.

Figure 2:
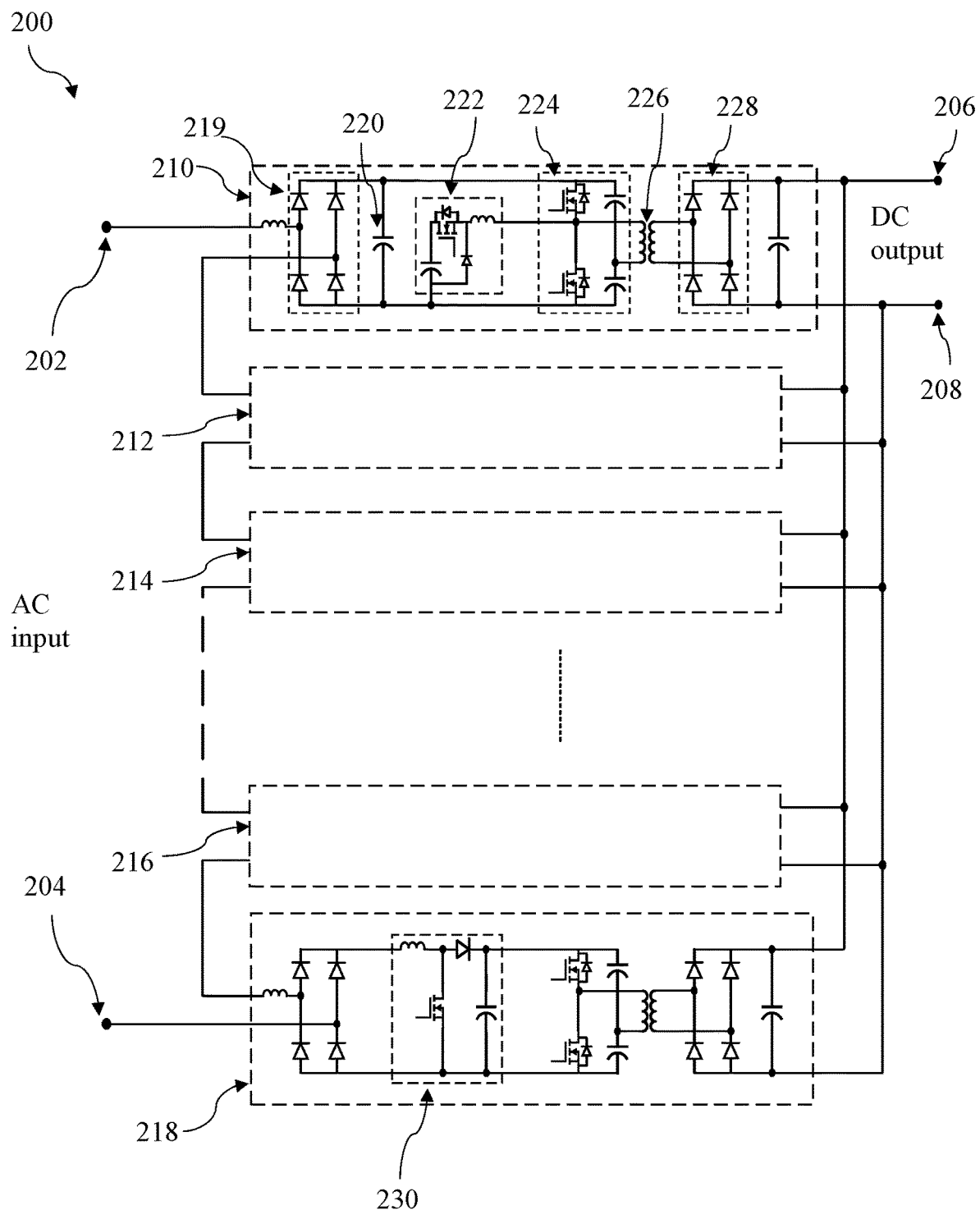
FIG. 2 illustrates a modular AC-DC power conversion system with transformer isolated modules connected in series on the input side and parallel on the output side, with bypass of one or more of the individual modules achieved by retrieving the input-side dc link capacitor energy in the module through an auxiliary circuit followed by shorting the dc link, according to one embodiment of the present invention.

FIG. 2 illustrates a power conversion system, 200, according to an embodiment of the present invention. The power conversion system has an AC input port with terminals, 202 and 204, and a DC output port with terminals, 206 and 208. The power conversion system has multiple power converter modules or building blocks, 210, 212, 214, 216 and 218. The modules are connected in series on the AC input side and parallel on the DC output side. The modules 212, 214 and 216 have substantially identical operating mode and structure as module 210. Module 210 consists of an input rectifier, 219, which feeds a DC link or bus capacitor 220 which further feeds a half-bridge, 224, consisting of switches. When the module 210 is required to be in the active mode, half-bridge 224 is operated to place a high frequency substantially square wave voltage across the transformer 226 which feeds the DC output 206 through rectifier 228. When the module 210 is required to be in the bypassed state, auxiliary circuit 222 removes the energy from capacitor 220 followed by half-bridge 224 being placed in a 'shorted'/conducting mode. This results in module 210 bypassing the input current through the rectifier 219 and half-bridge 224 switches, with no power transfer to the output through its transformer. Module 218 is operated to provide a variable input-output ratio by pulse-width modulation of switching stage 230. The overall converter system 200, provides a variable input-output gain and control of the DC output through adjustment of the number of modules among 210, 212, 214, and 216 that are active and bypassed, and through adjustment of the gain of module 218.

Figure 3:
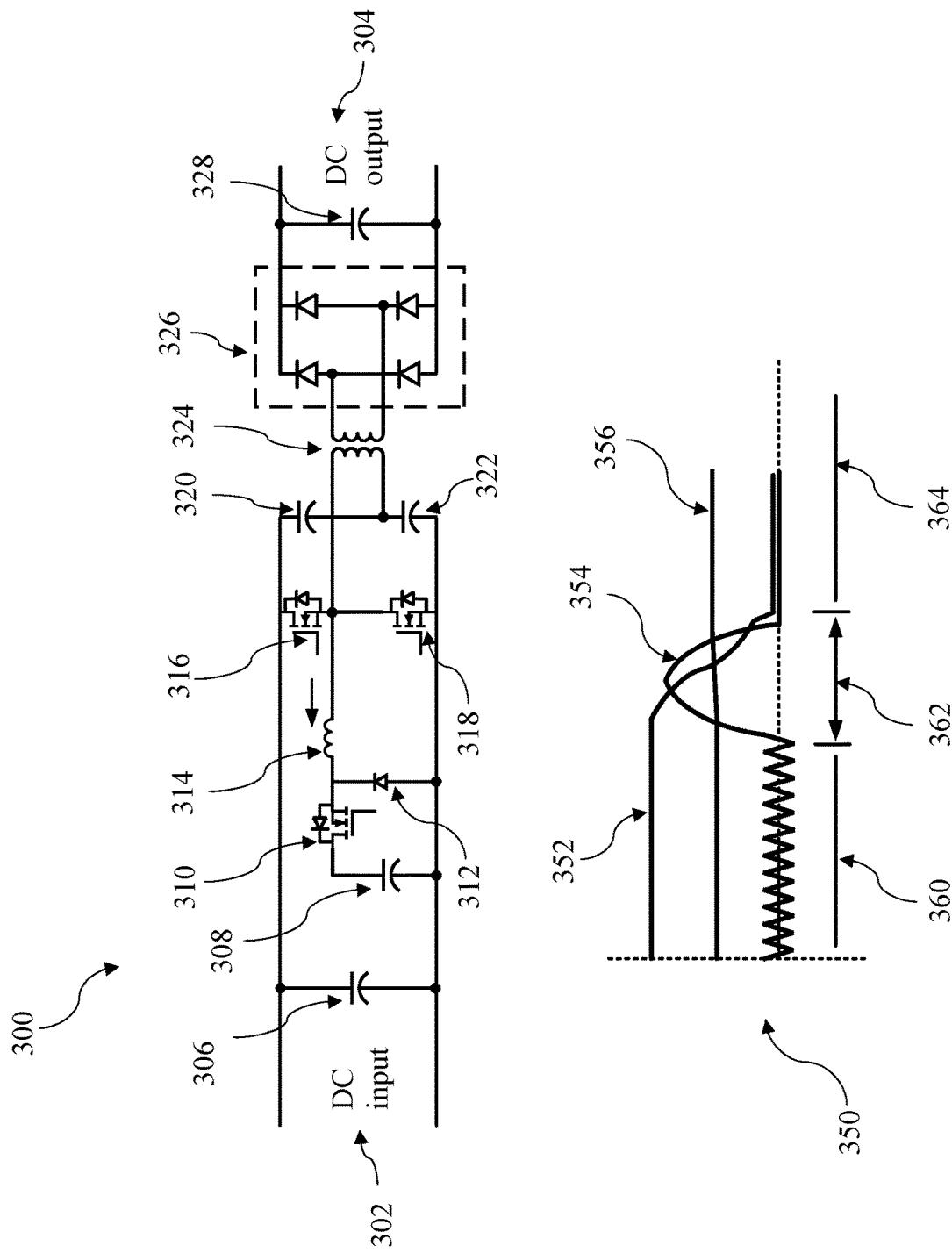
FIG. 3 illustrates the voltage and current waveforms related to the bypassing of a module using the auxiliary circuit to retrieve the energy in the dc bus or link capacitance in the module such that the dc bus or link is substantially at zero voltage prior to shorting the module, according to one embodiment of the present invention.

FIG. 3 illustrates a module 300 according to an embodiment of the present invention. The module DC input feeds a DC bus capacitor 306 which further feeds a half-bridge comprising of switches 316 and 318 and split capacitors 320 and 322. When the module 300 is in an active mode, the half-bridge converts the DC input 302 to a high frequency voltage across the primary of transformer 324, the output of which is rectified through rectifier 326 to feed the capacitor 328 and DC output 304. During the active mode of module 300, the auxiliary switch 310 is kept ON and the auxiliary capacitor 312 is charged to substantially half the DC input voltage through the switching action of 316 and 318 and inductor 314. When the module 302 is commanded to go into a bypass mode, switches 316 and 310 are kept on for an elongated duration to initiate a resonant transfer of energy from capacitor 306 to auxiliary capacitor 308. At a point near the end of this resonant cycle, the voltage across the DC capacitor 306 becomes nearly zero, at which point the switches 316 and 318 are turned on to create a conduction path for bypassing the module. Switch 310 is turned off to preserve the voltage across capacitor 308 and effectively separate it from the circuit. To bring back module 302 to an active mode, switches 316 and 318 are removed from their cross-conduction bypass mode and returned to their complimentary switching with switch 310 also turned on. Waveforms 350 illustrate the voltage 352 across DC capacitor 306, current 354 through the auxiliary switch and voltage 356 across the auxiliary capacitor 308. The module 300 is in the active mode during duration 360, in the bypassed mode during duration 364, and in the transition mode in the intermediate duration 362.

Figure 4:
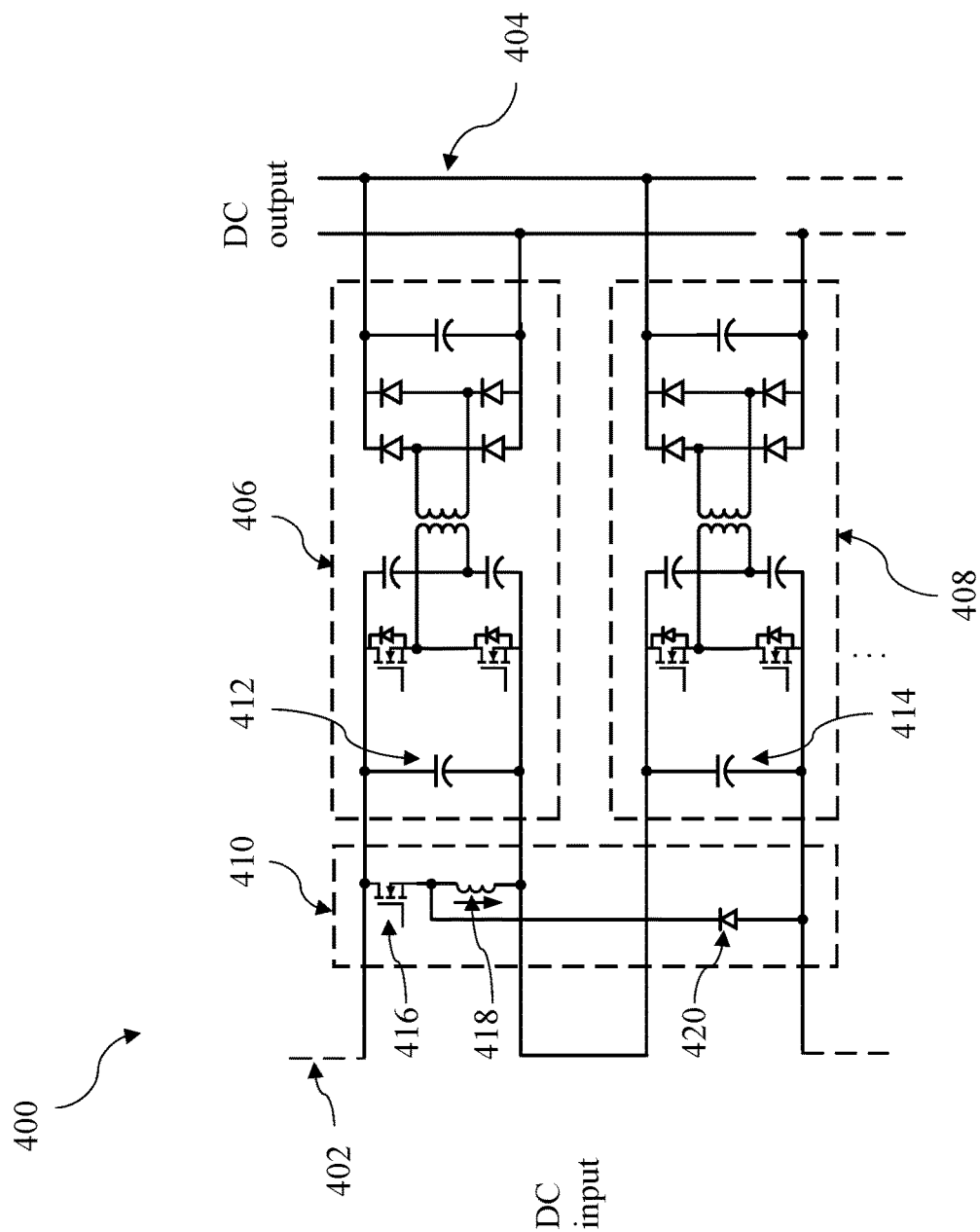
FIG. 4 illustrates an auxiliary circuit to retrieve the energy in the dc bus or link capacitance of a module and shuffle it to a neighboring module, to allow the shorting and bypassing of the first module, according to one embodiment of the present invention.

FIG. 4 illustrates a portion, 400, of a modular power conversion system according to an embodiment of the present invention. Modules 406 and 408 share an auxiliary circuit 410. When module 406 is to be placed in a bypass mode, the energy in its capacitor is transferred to the inductor 418 through switch 416 in the auxiliary circuit 410. This brings the voltage across capacitor 412 to substantially zero at which point the half-bridge switches in module 406 can be used to provide a cross-conduction path to place the module 406 in a bypassed state. Switch 416 is subsequently turned off to force the current in inductor 418 to free-wheel through diode 420 and transfer energy to the DC capacitor 414 of module 408. Module 408 can similarly be bypassed by transferring its energy to a different neighboring module in the chain through a shared auxiliary circuit.

Figure 5:
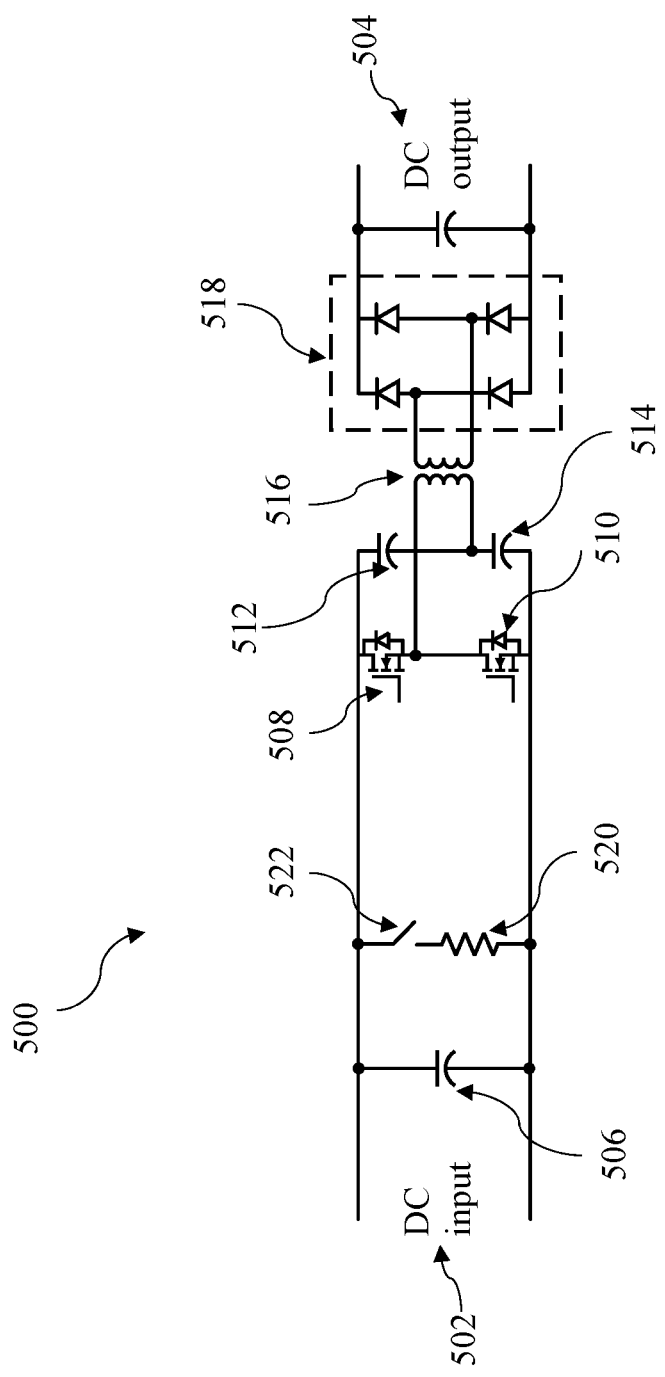
FIG. 5 illustrates an auxiliary circuit comprising a dissipative element that is switched in to dissipate the energy in the dc bus or link capacitance in the module such that the dc bus or link is substantially at zero voltage prior to shorting and bypassing the module, according to one embodiment of the present invention.

FIG. 5 illustrates a module, 500, where the energy stored in its capacitor 506 is dissipated in a resistor 520 through switch 522 which is activated when the module 500 needs to be bypassed. When the capacitor 506 is discharged to near-zero voltage, switches 508 and 510 can be switched on and kept on simultaneously in a cross-conduction mode to place the module 500 in a bypassed mode. In the active mode, switches 508 and 510 can revert to complementary switching to feed the transformer 516 and output 504.

Figure 6:
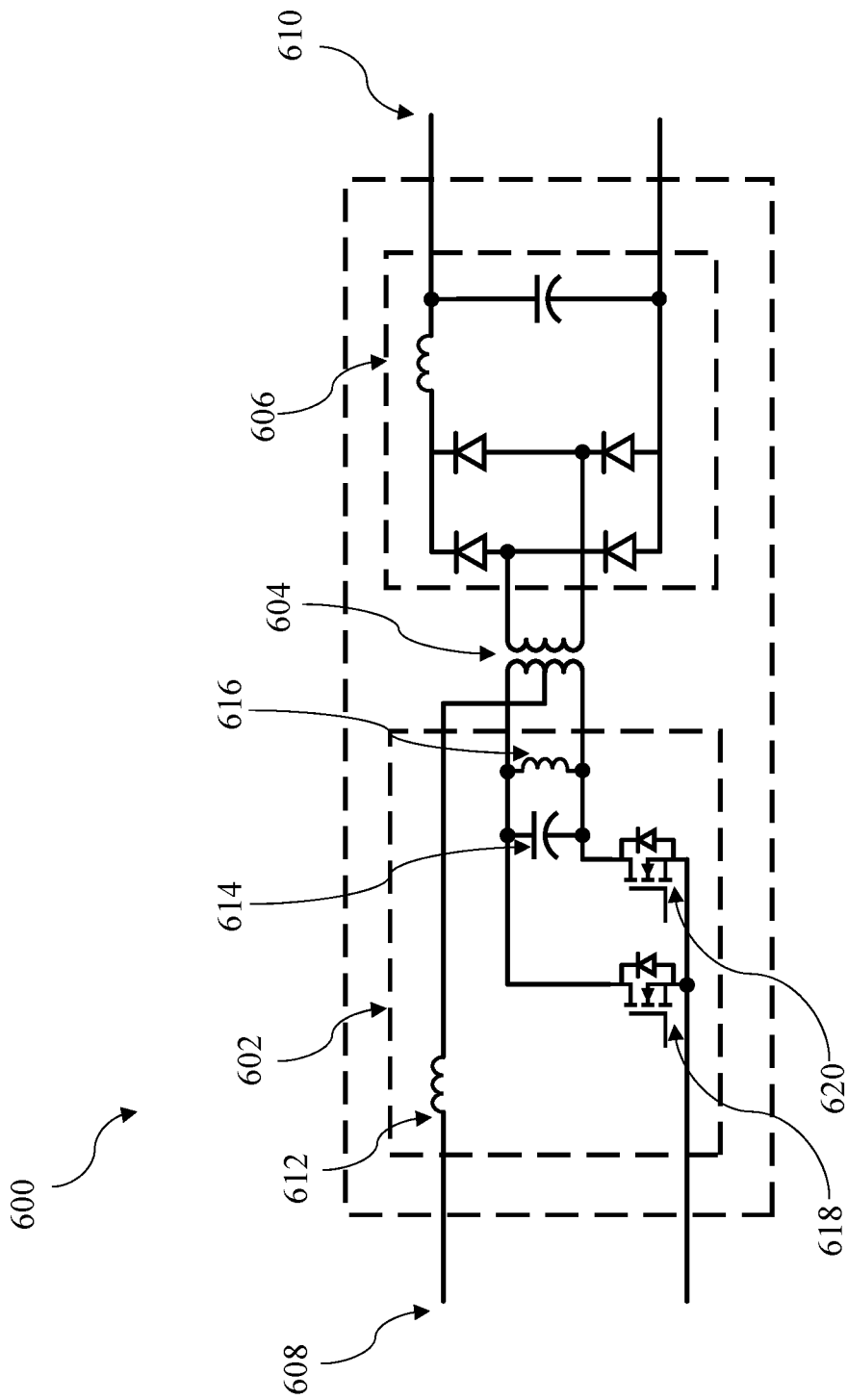
FIG. 6 illustrates a module using a resonant circuit consisting of capacitance and inductance, and complementary switches that do not substantially overlap in conduction when the module needs to be actively inserted and switching in the power conversion system, but substantially overlap in conduction when the module needs to be bypassed.

FIG. 6 illustrates a module, 600, according to yet another aspect of the invention. Module 600 comprises a resonant circuit with inductor 616 and capacitor 614 wherein the resonance naturally results in instances of substantially zero voltage across the resonant capacitor 614 when the module 600 is in an active switching mode with switches 618 and 620 operating in a complimentary square-wave mode.

Figure 7:
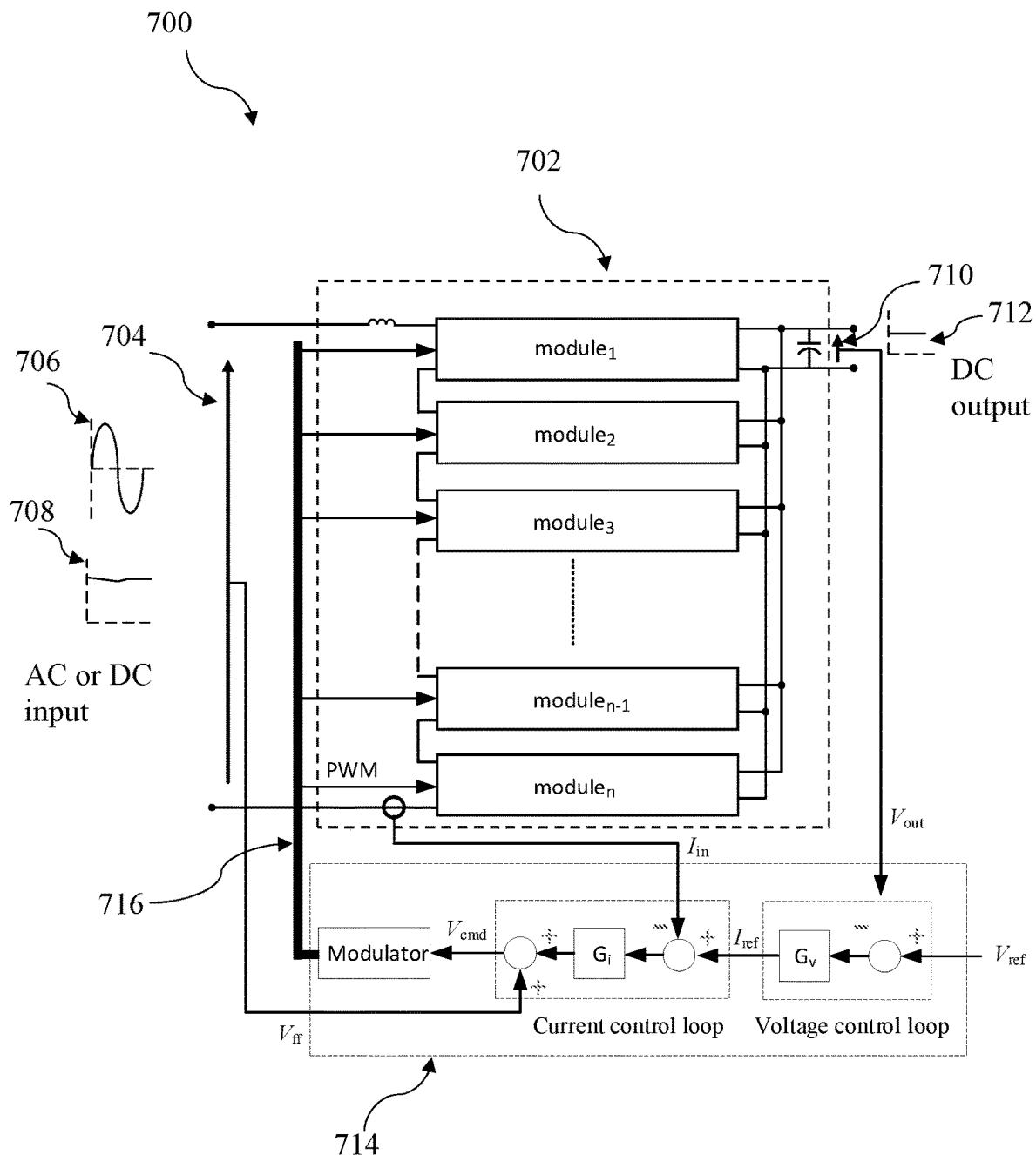
FIG. 7 illustrates a modular power conversion system with modules connected in series on the input side and connected in parallel on the output side, with a control system commanding some of the modules to be inserted or bypassed on the input side, and commanding one module to operate in a pulse-width-modulated (PWM) mode, such that a desired input-to-output voltage ratio can be attained.

FIG. 7 illustrates a power converter system 700 consisting of a set 702 of power converter modules and a controller 714. The system has an AC input 706 or DC input 708 across its input terminals 704. The input can be varying with the DC output 712 requiring regulation to a desired set value. Controller 714 senses the input and output voltages and currents and commands a portion of the modules to be in a fixed-ration active mode or in a bypass mode, and commands the remaining modules with a variable PWM signal.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. A modular power conversion system comprising multiple modules,
   wherein the multiple modules are connected in series on an input side and in parallel on an output side; and
   wherein one or more of the multiple modules comprise a first and second power semiconductor switches and transformer isolation; and
   wherein one or more of the multiple modules comprise a dc bus or link; and
   wherein one or more of the multiple modules comprise an auxiliary circuit comprised of a switch and an inductor element, and
   wherein a number of the multiple modules are operated in an active mode with a fixed input-to-output voltage ratio; and
   wherein another number of the multiple modules are operated in a bypassed mode with a conduction path across the input side and with no power transfer to the output side; and
   wherein prior to bypassing any one of the number of multiple modules, an energy in its internal dc bus or link is removed to the inductor element or to an adjoining module in the power conversion system; and
   wherein after removal of the energy in the internal dc bus or link, the first and second power semiconductor switches are turned on to provide a short-circuit conduction path across the internal dc bus or link in the bypassed mode.

2. The modular power conversion system of claim 1, further comprising a controller which adjusts a ratio of the number of the multiple modules that are operated in the active mode and the number of the multiple modules that are operated in the bypassed mode to vary an overall input-to-output voltage ratio for the power conversion system.

3. The modular power conversion system of claim 1, further comprising at least one module that has a variable input-to-output voltage ratio that is adjustable through a duty cycle or a pulse-width modulation control to regulate an overall input-to-output voltage ratio of the power conversion system.

* * * * *